July 5, 1955 V. SYNEK 2,712,480
AXLE BOXES
Filed Jan. 12, 1953 2 Sheets-Sheet 1
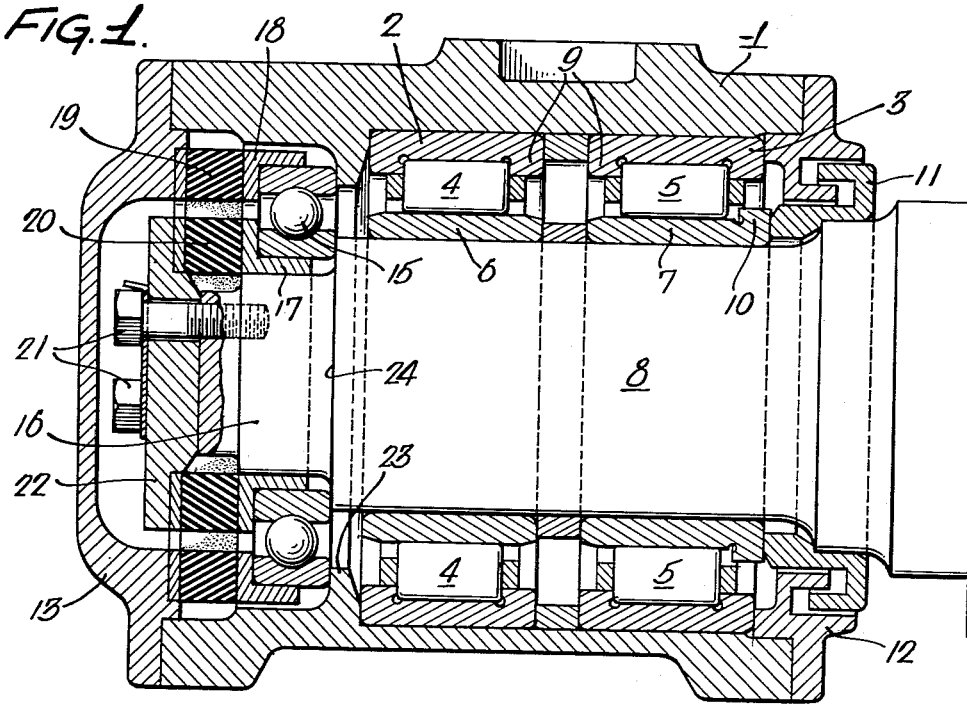
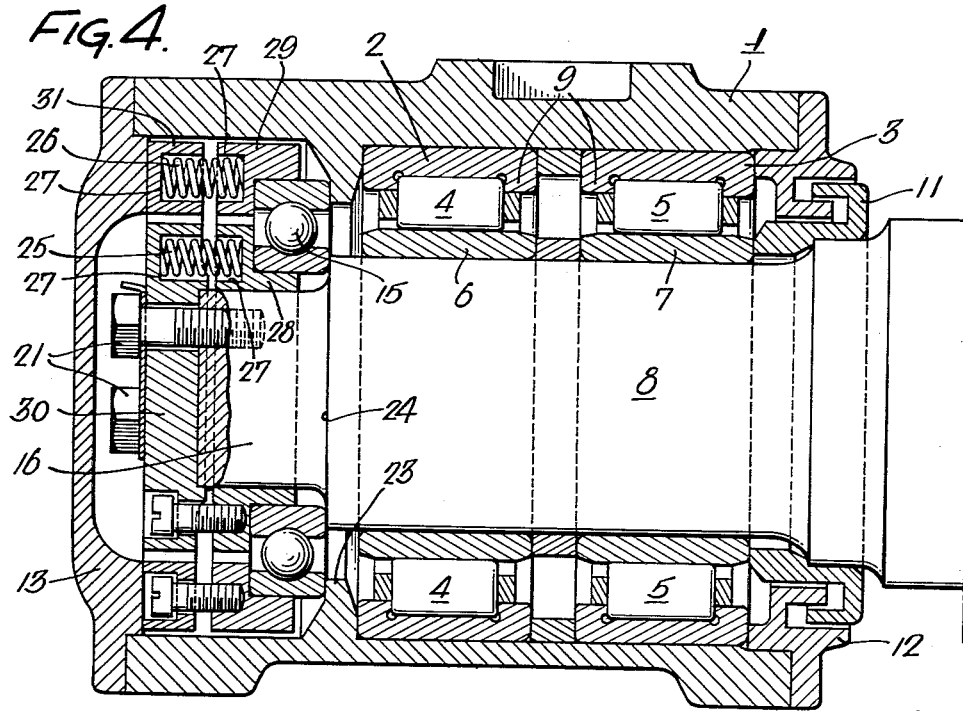
Inventor:
Viktor Synek
by his Attorneys
Howson & Howson July 5, 1955   V. SYNEK   2,712,480
AXLE BOXES
Filed Jan. 12, 1953   2 Sheets-Sheet 2

Inventor:
Viktor Synek
by his Attorneys
Howson & Howson

United States Patent Office 2,712,480
Patented July 5, 1955

2,712,480
AXLE BOXES

Viktor Synek, Goteborg, Sweden, assignor, by mesne assignments, to SKF Industries, Inc., Philadelphia, Pa., a corporation of Delaware Application January 12, 1953, Serial No. 330,769

2 Claims. (Cl. 308—180)

On certain rail vehicles the axle boxes are designed to permit of an axial displacement of the axle relative to the box within certain predetermined limits. Heavy shocks in the crosswise direction of the vehicle should, however, be avoided in order to obtain smoother running.

In some cases resilient members have been built into the axle box in order to absorb energy upon the displacement of the shaft in the box and at the same time to create a force which returns the axle to its normal position. In some of these designs one of the rings of the radial load carrying bearing or bearings must be axially displaceable which however, entails certain disadvantages and decreases the life of the bearing.

The present invention relates to a resilient device in axle boxes in which the axle is displaceable relative to the box and which is further of simple design and in a satisfactory manner meets all the requirements on an axle box.

The axle box according to the invention is provided with a separate bearing comprising two annular members for carrying thrust loads in both directions and is characterized substantially thereby that the said separate bearing is axially displaceable relative to both the axle and the box and that a resilient member is disposed between one of the annular members of the bearing and a preferably annular member fixed to the axle and that another resilient member is disposed between the other annular member of the bearing and a member fixed to the box in such a manner that both resilient members act independently of each other so that one of the said members exerts an energy absorbing effect upon displacement of the axle relative to the box in one direction and the other resilient member exerts an energy absorbing effect upon displacement in the opposite direction.

Figure 2:
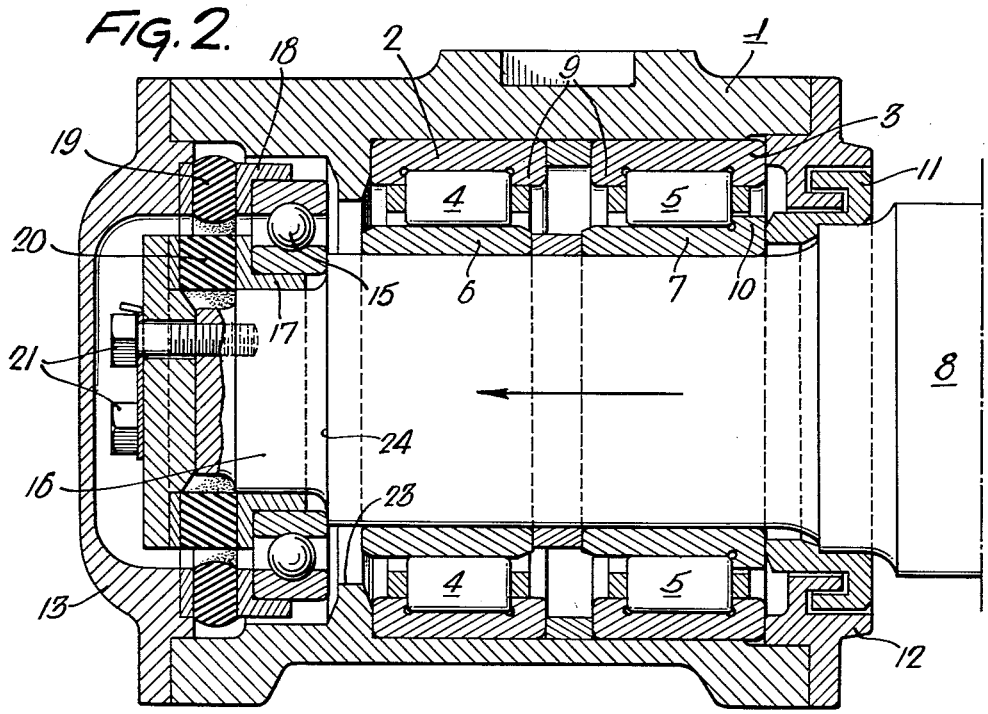
Figure 3:
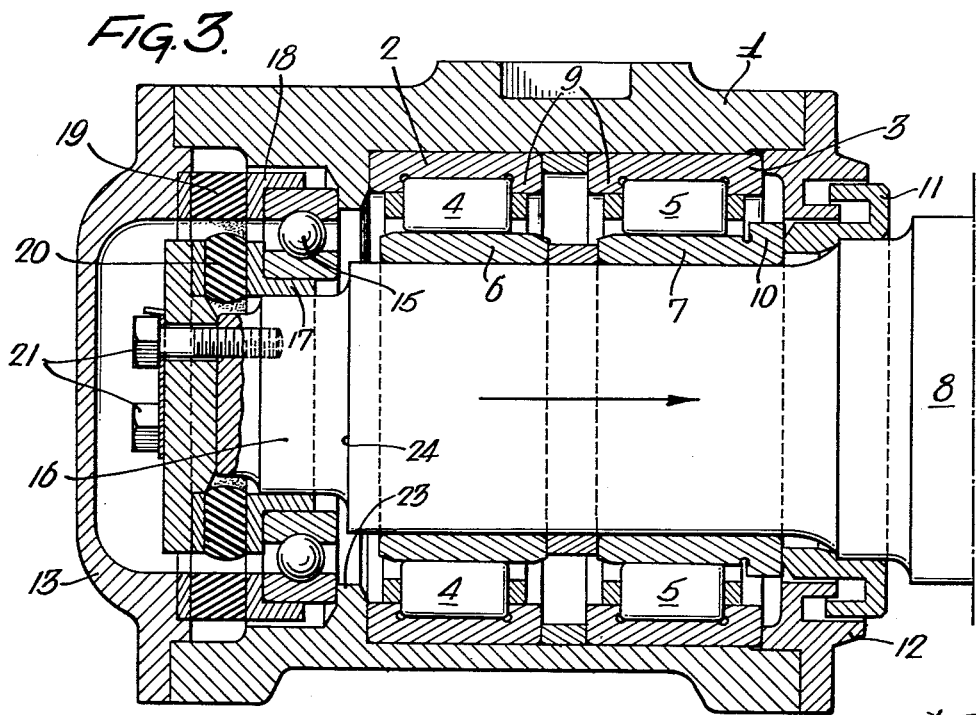

The invention is described in connection with the accompanying drawings in which Fig. 1 shows an axial section through an axle box with the axle in the normal position. Fig. 2 shows the relative positions of the parts upon displacement of the axle toward the left in the figure and Fig. 3 shows a corresponding view upon displacement in the opposite direction. Fig. 4 shows another form of the invention.

In an axle box 1, shown in Fig. 1, are mounted the outer race rings 2 and 3 of two cylindrical roller bearings, the rows of rollers of which are designated 4 and 5. Inner race rings 6 and 7 respectively of the roller bearings are mounted on an axle 8. The outer rings are provided at both sides with flanges 9 which guide the rollers. The inner race ring 6 is without flange and the inner race ring 7 is provided with a flange 10 at its inner side. This flange is so disposed relative to the row 5 of rollers, that in normal position there is play between the flange and the ends of the rollers, as is apparent from Fig. 1. The box is sealed by an annular labyrinth member 11 mounted on the shaft and cooperating with another annular labyrinth member 12 in the axle box. The box is closed outwardly by a cover 13.

A single row deep groove ball bearing 15 is mounted on a projection 16 of the axle for carrying thrust loads. The inner ring of the ball bearing is mounted on a flanged ring 17, the outer race ring is mounted in another flanged ring 18. The bearing 15 with the flanged rings 17 and 18 is displaceable relative to the projection 16 and the box 1 respectively. This bearing is not subjected to radial load. Between the cover 13 and the flanged ring 18 is provided a resilient member, in this case a ring 19 of rubber. A similar rubber ring 20 is disposed between the flanged ring 17 and a disc 22 fixed to the end of the shaft by means of screws 21. The rubber ring 20 thus rotates with the axle. In the normal position, which is shown in Fig. 1, the inner side face of the outer ring of the ball bearing 15 abuts against a flange 23 in the axle box and the corresponding side face of the inner ring abuts against a shoulder 24 on the axle. The distance between the flange 23 and the cover and between the shoulder 24 and the disc 22 respectively are preferably so chosen, that the rubber rings are subjected to a certain initial load when mounted. This initial load can be chosen as required within certain limits.

The boxes are assumed to be guided in the frame. The device functions in the following manner: If the shaft is subjected to an outer thrust force, which is not sufficient to overcome the initial load in the rubber ring which takes up forces in the direction in question, the axle will retain the relative position with respect to the box, shown in Fig. 1.

When the axle is subjected to a thrust force directed toward the left in the figures of sufficient magnitude to overcome the preload in the ring 19, the axle will be displaced toward the left relative to the box, as shown by Fig. 2. This displacement will be possible because of the design of the inner race rings of the roller bearings. The axle carries with it the ball bearing 15 thus compressing the rubber ring 19, as is apparent from Fig. 2. The rubber ring 20 shown on the other hand does not carry any of the outer load, since the inner race ring of the ball bearing is displaced together with the axle.

If the axle is subjected to an outer thrust load in the opposite direction, i. e., toward the right, the conditions will be those, shown in Fig. 3. In this case, the flanged rings 17 and 18 will retain their positions relative to the box, since the outer ring of the bearing 15 already presses against the flange 23. The stresses in the rubber ring 19 will thus remain unaltered. On the other hand the axle and the disc 22 will be displaced relative to the flanged ring 17 and the rubber ring 20 will be compressed, as shown in the figure. At the same time, there will be a displacement between the rollers 4 and 5 and the respective inner bearing rings 6 and 7. Thus, one of the rubber rings in the box is active for a thrust in one direction, while the other rubber ring is active only when the thrust is in the opposite direction.

If the boxes at both ends of the axle are designed, as shown in Figures 1–3, Fig. 3 can also be regarded as a reversed showing of the conditions pertaining at the same time in the other box for a force, which in the other box results in conditions similar to those shown in Fig. 2. The outer rubber ring 19 in one of the boxes and the inner rubber ring 20 in the other box thus cooperate, so that these rings together oppose the thrust. For a thrust in the opposite direction the conditions in the both boxes are reversed.

The axle is displaced only when the initial load of the outer rubber ring 19 in one of the boxes and the inner rubber ring 20 in the other box has been overcome and the displacement increases, until equilibrium occurs between the outer force and the resistance to displacement set up by the stresses in the rubber rings. For still greater forces arrangements have been made to limit the displacement, since the rollers 5 of the inner bearing then come into contact with the flange 10, shown in Fig. 2, which limits movement toward the left. Movement in the opposite direction is limited by a corresponding flange in the axle box at the opposite end of the axle. In this way it is possible to avoid subjecting the resilient members to excessive strain. The rubber rings may be so made and mounted that, for instance, their compression begins only at about one quarter and is limited to, for example, about one half of the calculated maximum thrust.

Fig. 4 shows a form of the invention which differs from the form shown in Fig. 1, in that the rubber rings have been replaced by an inner and outer series of springs 25 and 26 respectively, which are mounted in pockets 27 in an inner flanged ring 28 and in an outer flanged ring 29, corresponding to the previously mentioned flanged rings 17 and 18 and in a disc 30 screwed to the axle and a ring 31 abutting against the cover 13 of the box respectively. In this form of the invention, the flange on the inner ring 7 of the inner bearing, may be dispensed with, since the axial movement of the axle is limited when the ring 28 and the disc 30 and rings 29 and 31 respectively come into contact with each other. In this form of the invention, the rolling bearings can be of the same type.

The inner rings of the roller bearings may be provided with guide flanges for the rollers and the outer rings lack flanges limiting the movement in one direction.

I claim:

1. In an axle box assembly for railway vehicles and the like, a box, an axle journalled in and axially displaceable relative to the box, a separate bearing for taking up thrust forces in both directions between said box and axle, said bearing comprising two annular members and interposed anti-friction elements, abutments on the axle and box for limiting the axial movements of the respective annular bearing members in one direction, members fixed respectively to the axle and box opposite to the respective abutments, and resilient members disposed between the said respective annular members and the respective fixed members so as to act independently through the respective annular members to resist movements of the bearing in the opposite direction with respect both to the axle and box, whereby one of said resilient members exerts an energy absorbing effect upon displacement of the axle relative to the box in one direction and the other resilient members exerts an energy absorbing effect upon displacement in the opposite direction.

2. An axle box assembly according to claim 1 wherein the resilient members are preloaded.

References Cited in the file of this patent

FOREIGN PATENTS

| | | |
|---|---|---|
| 309,855 | Italy | July 18, 1933 |
| 490,944 | Great Britain | Aug. 24, 1938 |